Oct. 27, 1970   F. V. GUERRERO   3,535,741
PIPE BELLING DEVICE
Filed April 12, 1968
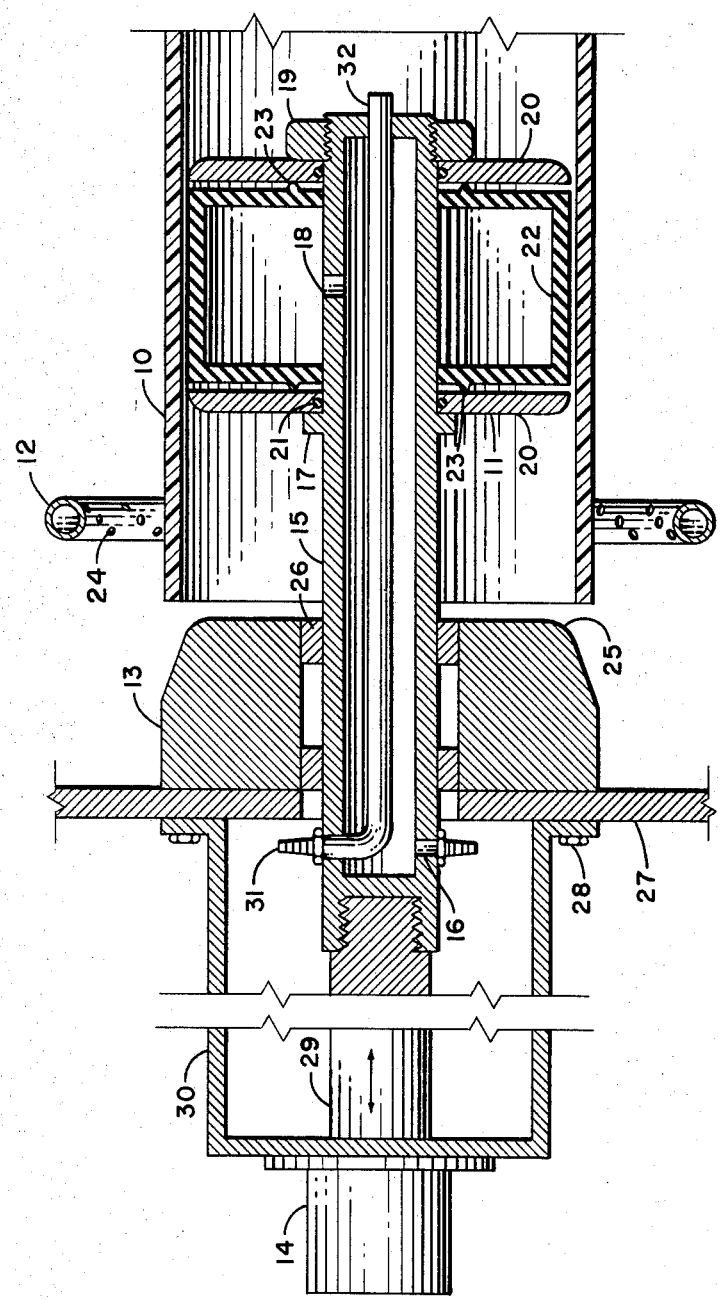
INVENTOR.
FERNANDO V. GUERRERO
BY
William A. Mikesell Jr.
ATTORNEY

3,535,741
PIPE BELLING DEVICE

Fernando V. Guerrero, Chagrin Falls, Ohio, assignor to Continental Oil Company, Ponca City, Okla., a corporation of Delaware
Filed Apr. 12, 1968, Ser. No. 720,956
Int. Cl. B29c 17/02
U.S. Cl. 18—19                                           3 Claims

ABSTRACT OF THE DISCLOSURE

A device for belling or flaring the end of a heat-softenable hollow cylindrical object, comprising an expansible gripper for frictionally engaging the interior of the object, a male shaping die, means for heating the end of the object, and means for pulling the gripper toward the die.

---

This invention relates to a device for belling or flaring an end of a hollow cylindrical heat-deformable object such as a plastic pipe or conduit.

Pipe or conduit has long been jointed, especially for low pressure service, by what is commonly known as the bell-and-spigot joint. Such joints comprise simply sliding a uniform-diameter end of a pipe into the flared or belled end of another, and are sometimes also provided with a gasket or other sealing means. Flaring of the pipe ends has, in the past, required either an inordinate amount of manual labor, a complex and expensive machine, or use of an expensive separate molded end socket piece which is cemented or otherwise fastened to the pipe.

It is accordingly an object of this invention to provide a simple and inexpensive apparatus for belling pipe ends. Other objects and the several advantages of the invention will become apparent upon study of this disclosure, the appended claims, and the drawing, in which the sole figure represents a view, partially in elevation and partially in section, of a preferred embodiment of the invention.

Generally speaking, the invention comprises an expensible gripping device which is inserted for some distance into the open end of the pipe to be belled and is then expanded so as to grip the internal surface of the pipe frictionally, a heating source which is used to soften the end of the pipe to be belled, a male internal forming die having an external configuration corresponding to the desired internal configuration of the bell end, and means for pulling the gripper toward the die.

Referring now to the drawing, the hollow cylindrical heat-softenable object to be belled, in this instance a plastic pipe, is indicated at 10. The gripping device assembly is indicated generally as 11, the heating source as 12, the forming die as 13, and the pulling means as 14. Returning now to the gripper assembly 11, this comprises a hollow axially reciprocable shaft 15 having a gas inlet and port connection 16, a protuberance 17, a gas outlet port 18, and a nut 19. Fitted onto shaft 15 are a pair of retaining washers 20, which can be gas-sealed to shaft 15 as by O-ring gaskets 21, and a flexible diaphragm member 22. Diaphragm 22 can be supported over its internal surface as by a rigid perforated member, not shown, to prevent inward collapse of the diaphragm when it is squeezed between the two washers 20 by stop protuberance 17 and nut 19 during assembly, and can be gas-sealed against the two washers 20 as by annular ridges 23. Heating source 12 is indicated schematically as a ring-manifold gas burner having a plurality of perforations 24 positioned so as to direct heat at the appropriate area of the end of pipe 10 to be softened. It will be obvious that other direct or indirect heat sources, such as electrical heaters or immersion in a heating liquid, can be used. Male forming die 13 is preferably comprised of a block of material having good thermal conductivity and a low coefficient of friction with respect to the plastic being belled. Die 13 is preferably provided with a round or streamline nose portion 25, and can further be provided with internal heating and/or cooling means, such as liquid passageways therein not shown. Die 13 also conveniently contains bearings 26 which support and allow axial sliding movement of shaft 15 therein. The die assembly, and the gripper assembly which it supports, can be mounted on a support member 27 as by bolts 28. Lastly, pulling means 14 is here indicated as being a hydraulic cylinder 14 coupled by rod 29 to shaft 15, and supported on member 27 by frame 30, although it will be obvious that other lineal actuating means, such as a mechanical rack-and-pinion, can be used.

In operation, pipe 10 which is to be belled is placed over gripper assembly 11 such that the pipe end extends beyond the gripper and into the region covered by heater 12. Fluid pressure, such as gas or air pressure, is then applied by way of inlet 16, the hollow of shaft 15, and passage 18 into the interior of diaphragm 22, causing the diaphragm to expand outwardly and frictionally engage the inner surface of pipe 10, gripping the pipe and holding it in the location shown in the figure. Heater 12 can then be actuated to the extent necessary to soften the end of pipe 10 for its subsequent deformation. When the pipe end is sufficiently soft, the heater can be deactivated, and cylinder 14 is then actuated to pull shaft 15, and consequently gripper 11 and pipe 10, to the left. The end of pipe 10 is thus pulled over the outer surface of die 13, and is allowed to remain in this position until it is sufficiently cooled to hold its form. The pipe can then be removed by actuating cylinder 14 to push gripper assembly 11 to the right; releasing the fluid pressure from diaphragm 22 completes the cycle. If heating and/or cooling means are used in die 13, the heaters are used to pre-heat the die prior to pulling the softened pipe end over it so as to avoid localized chilling, and the coolers are used after the pipe is pulled onto the die in order to hasten the solidifying of the plastic and thus shorten the cycle time. Die 13 can have any external configuration so as to form the desired bell shape, but it will be obvious that any undercut faces on the die will require a multi-piece collapsible die to make removal of the formed pipe end possible. The method of cycle operation just described can be modified by heating the pipe end at some other location to soften it prior to its placement on gripper 11, although this latter method is less preferred because of the time lapse required to manipulate the softened pipe end into position. The entire cycle, i.e. activation and deactivation of the gripper, heater, and puller, can be automated by a suitable cycle timer controlling the various fluid flows, with the cycle being initiated by a switch sensing the presence of a pipe on the gripper.

One additional embodiment of this device allows bending of large-radius elbows while the pipe is in place on this machine. Such embodiment requires additional heaters placed along the length of the pipe which is to be bent, and further requires that the end of the pipe opposite the belled end be plugged. Such plugging can be effected by a gripper assembly similar to 11, but portable to the extent of being supplied pressurizing fluid by a flexible hose. Alternatively, such plugging can be effected e.g. by a suitably sized "cork." In any event, when it is desired to bend the pipe into an L, one end of the pipe is maintained stationary by gripper 11 of the figure. The other end is plugged by a suitable means. Fluid pressure, such as air pressure, is then introduced into the pipe between gripper 11 and the plug in its opposite end by way of inlet fitting 31 and tubing 32, which communicates with the space within the pipe between gripper 11 and the opposite plug. The pipe wall is then softened at the appropriate spot, bent into the desired configuration, as against fixed jigs, maintained in such position until rigid, and then depressured by venting from port 31. Internal pressure is often necessary, when bending pipe or tubing, to prevent wall collapse, and the present device provides a convenient means for holding one pipe end in a fixed position while, at the same time, providing for pressurizing the pipe interior.

Although several preferred embodiments of the present invention have been described in detail, it is to be understood that various changes, substitutions and alterations can be made therein without departing from the spirit and scope of the invention as defined by the appended claims.

What is claimed is:

1. A device for shaping the end portion of a hollow cylindrical heat-softenable object which comprises:
    (a) expansible gripper means comprising a hollow cylindrical rubber diaphragm and fluid pressure source means in communication with the interior of said diaphragm, said gripper means being of a diameter such that, in relaxed condition, it is smaller in a direction normal to the length of said object than is said hollow and, in expanded condition, is larger in said direction than is said hollow,
    (b) means for heating an end of said object,
    (c) die means of external configuration corresponding to the internal configuration of the desired shape of said object, and
    (d) means for pulling said gripper means toward said die means.

2. The device of claim 1 wherein said external configuration of said die means comprises a frusto-conical surface whose axis of rotation corresponds with the longitudinal axis of said gripper means.

3. The device of claim 2 further provided with means for passing a pressurized fluid through both of said die means and said gripper means.

References Cited

UNITED STATES PATENTS

| | | |
|---|---|---|
| 2,779,996 | 2/1957 | Tanis. |
| 3,341,894 | 9/1967 | Flaming. |

FOREIGN PATENTS

| | | |
|---|---|---|
| 1,112,223 | 3/1956 | France. |
| 1,087,168 | 10/1967 | Great Britain. |

J. SPENCER OVERHOLSER, Primary Examiner

J. E. ROETHEL, Assistant Examiner